(12) United States Patent
Tanaka et al.

(10) Patent No.: US 7,999,499 B2
(45) Date of Patent: Aug. 16, 2011

(54) ROTATING ELECTRICAL MACHINE CONTROL SYSTEM AND VEHICLE DRIVE SYSTEM

(75) Inventors: Kazuhiro Tanaka, Chiryu (JP); Jin Izawa, Obu (JP); Yoshinori Oono, Nukata (JP); Kazuo Aoki, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 386 days.

(21) Appl. No.: 12/382,049

(22) Filed: Mar. 6, 2009

(65) Prior Publication Data

US 2009/0242293 A1 Oct. 1, 2009

(30) Foreign Application Priority Data

Mar. 28, 2008 (JP) .................................. 2008-087883

(51) Int. Cl.
*H02P 7/00* (2006.01)
(52) U.S. Cl. ......... 318/434; 318/376; 318/800; 318/801
(58) Field of Classification Search .................. 318/434, 318/376, 800, 801; 180/65.1, 65.21, 65.285, 180/65.51, 65.8, 422
See application file for complete search history.

(56) References Cited

U.S. PATENT DOCUMENTS

| | | | | |
|---|---|---|---|---|
| 5,699,874 | A * | 12/1997 | Miyaura | 180/443 |
| 6,796,287 | B2 * | 9/2004 | Mogi et al. | 123/319 |
| 6,917,179 | B2 * | 7/2005 | Komatsu et al. | 318/700 |
| 7,279,862 | B1 * | 10/2007 | Welchko et al. | 318/564 |
| 7,377,877 | B2 * | 5/2008 | Ogata | 477/3 |
| 7,400,104 | B2 | 7/2008 | Sato | |

FOREIGN PATENT DOCUMENTS

| | | |
|---|---|---|
| JP | A-2003-65107 | 3/2003 |
| JP | A-2004-222362 | 8/2004 |
| JP | A-2007-203975 | 8/2007 |
| JP | A-2009-45946 | 3/2009 |

\* cited by examiner

*Primary Examiner* — Walter Benson
*Assistant Examiner* — Thai Dinh
(74) *Attorney, Agent, or Firm* — Oliff & Berridge, PLC

(57) ABSTRACT

A rotating electrical machine control system includes a rotating electrical machine, a frequency conversion portion, a voltage conversion portion, a torque limitation portion, and an abnormality detection portion. The torque limitation portion limits generation of a positive torque in a region of less than a rotational speed lower limit threshold value where a rotational speed of the rotating electrical machine is less than zero, and sets a region in which the positive torque is generated to a region of the rotational speed lower limit threshold value or greater, and the torque limitation portion limits generation of a negative torque in a region of greater than a rotational speed upper limit threshold value where the rotational speed of the rotating electrical machine is greater than zero, and sets a region in which the negative torque is generated to a region of the rotational speed upper limit threshold value or less.

9 Claims, 9 Drawing Sheets

F I G . 4
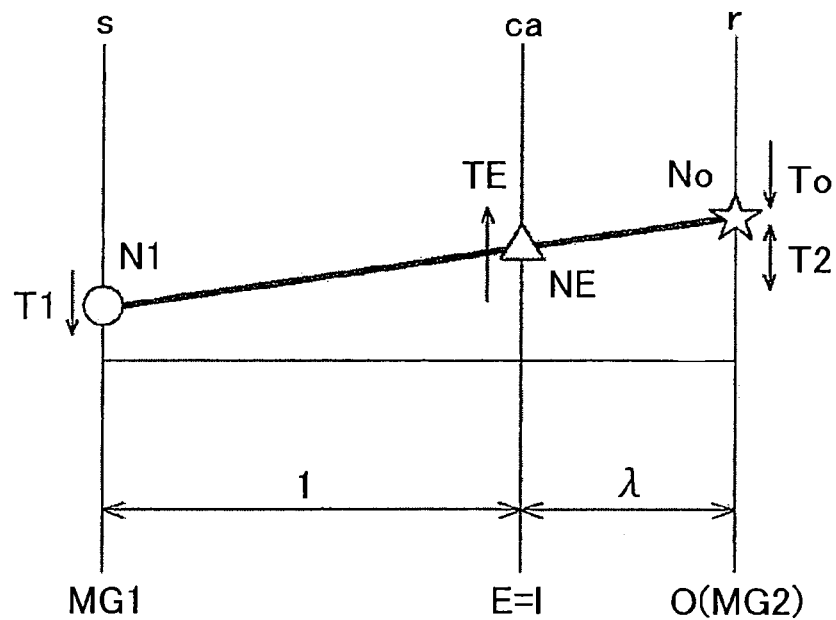
F I G . 5
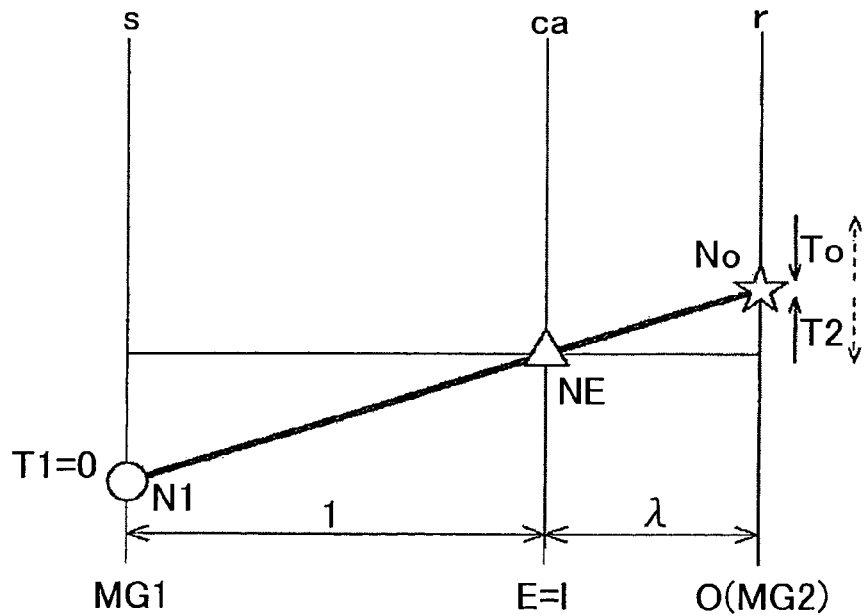

ROTATING ELECTRICAL MACHINE CONTROL SYSTEM AND VEHICLE DRIVE SYSTEM

INCORPORATION BY REFERENCE

The disclosure of Japanese Patent Application No. 2008-087883 filed on Mar. 28, 2008 including the specification, drawings and abstract is incorporated herein by reference in its entirety.

BACKGROUND

The present invention relates to a rotating electrical machine control system and vehicle drive system.

The rotating electrical machine control system is employed for controlling an operation state of a motor (which is one example of the rotating electrical machine) provided to an electric automobile, and is also employed for a so-called hybrid vehicle that includes a driving source such as an engine other than the rotating electrical machine and drives with driving force obtained appropriately from the rotating electrical machine and the other driving source.

According to Japanese Patent Application Publication No. JP-A-2004-222362, a voltage conversion device employed for such electric automobiles or hybrid vehicles has been developed. An example of the electric automobile is shown in FIG. 1 of JP-A-2004-222362, and an example of the hybrid vehicle is shown in FIG. 5 and the like of JP-A-2004-222362.

In a technique disclosed in JP-A-2004-222362, a control device 30 detects whether a boost converter 12 has failed based on a DC voltage Vb from a voltage sensor 10, an output voltage Vm from a voltage sensor 13, and a duty cycle in a switching control of NPN transistors Q1 and Q2. When a failure of the boost converter 12 is detected, the control device 30 controls an inverter 14 and an AC motor M1 to inhibit regenerative electricity generation of the AC motor M1 (see paragraphs [0076] and [0088]). As a result, the voltage conversion device capable of a failure process of the boost converter can be obtained without improving a withstand voltage-performance of a smoothing capacitor inserted on an input side of the inverter. Regarding a judgment on regeneration, according to the description of paragraph [0129], it can be understood that energy in the AC motor M1 is calculated based on an accelerator position and a motor rotational speed, and whether the AC motor M1 is in a power running mode or in a regeneration mode is determined based on the calculated energy. As should be appreciated, the reference numerals and the cited paragraphs are from JP-A-2004-222362.

SUMMARY

With the technique disclosed in JP-A-2004-222362, the energy is calculated based on the accelerator position and the motor rotational speed, and the power running and the regeneration are determined based on the energy. Therefore, the power running and the regeneration are determined based on the positivity or negativity of the energy, thereby limiting the regeneration in the case where the energy is negative. In a correlation diagram (of which one example is shown in FIG. 7) in which the abscissa shows the rotational speed and the ordinate shows the torque in the rotating electrical machine, a region in which the regeneration is limited is a region in a second quadrant where the rotational speed of the rotating electrical machine is zero or less in a state where the rotating electrical machine generates a positive torque, and is a region in a fourth quadrant where the rotational speed of the rotating electrical machine is zero or greater in a state where the rotating electrical machine generates a negative torque. However, it has been found that employing such a method causes problems described below at an uphill start, a downhill start, and the like.

Problem at Uphill Start

In the uphill start, there are cases where a so-called slip-down (reverse movement) occurs. In this state, a positive torque (forward torque) needs to be generated in a state where the rotating electrical machine operating as the motor (the AC motor M1 in the case described in Japanese Patent Application Publication No. JP-A-2004-222362) provides a negative rotation. However, since the motor rotation is negative, it is determined as the regeneration mode according to a determination method described above. Thus, the torque cannot be generated in the forward direction, and a vehicle cannot be started. Problem at Downhill Start In the downhill start, there are cases where a so-called slip-down (forward movement) occurs. In this state, a braking torque which is a negative torque needs to be generated in a state where the rotating electrical machine operating as the motor provides a positive rotation. However, according to the determination method described above, the torque cannot be generated in a braking direction. Thus, the vehicle cannot be started smoothly while applying a brake in the beginning. Further, the vehicle cannot be started in a similar manner in the case where it is necessary to start from a reverse movement state on a downhill.

In order to solve the problems described above, the present invention provides a rotating electrical machine control system which limits a torque generated by a rotating electrical machine operating as a motor for the purpose of protecting a smoothing capacitor in the case where, for example, a failure of a voltage conversion portion is detected, the rotating electrical machine control system being capable of generating a torque required, for example, to start a vehicle. The present invention can also achieve various other advantages.

According to an exemplary aspect of the invention, a rotating electrical machine control system includes a rotating electrical machine that drives a vehicle; a frequency conversion portion provided between a DC power supply and the rotating electrical machine, the frequency conversion portion converts an output of the DC power supply to alternating current when the rotating electrical machine performs power running and converts an output from the rotating electrical machine to direct current when the rotating electrical machine performs regeneration; a voltage conversion portion provided between the DC power supply and the frequency conversion portion, the voltage conversion portion increases a voltage of the output of the DC power supply based on a boost command value set in accordance with a requested torque requested for the rotating electrical machine; a torque limitation portion that limits a torque of the rotating electrical machine; and an abnormality detection portion that detects an abnormality requiring the voltage conversion portion to be stopped. When the abnormality detection portion has detected the abnormality, the torque limitation portion limits generation of a positive torque in a region of less than a rotational speed lower limit threshold value where a rotational speed of the rotating electrical machine is less than zero, and sets a region in which the positive torque is generated to a region of the rotational speed lower limit threshold value or greater, and the torque limitation portion limits generation of a negative torque in a region of greater than a rotational speed upper limit threshold value where the rotational speed of the rotating electrical machine is greater than zero, and sets a region in which the negative torque is generated to a region of the rotational speed upper limit threshold value or less.

BRIEF DESCRIPTION OF THE DRAWINGS

Various exemplary aspects of the invention will be described with reference to the drawings, wherein:

FIG. 4 is a velocity diagram in a hybrid drive mode of the hybrid drive device;

FIG. 5 is a velocity diagram in an EV drive mode of the hybrid drive device;

DETAILED DESCRIPTION OF EMBODIMENTS

Hereinafter, a rotating electrical machine control system according to an embodiment of the present invention will be described with reference to the accompanying drawings for a case where a hybrid drive device H having a split form is employed.

1. Hybrid Drive Device

Figure 1:
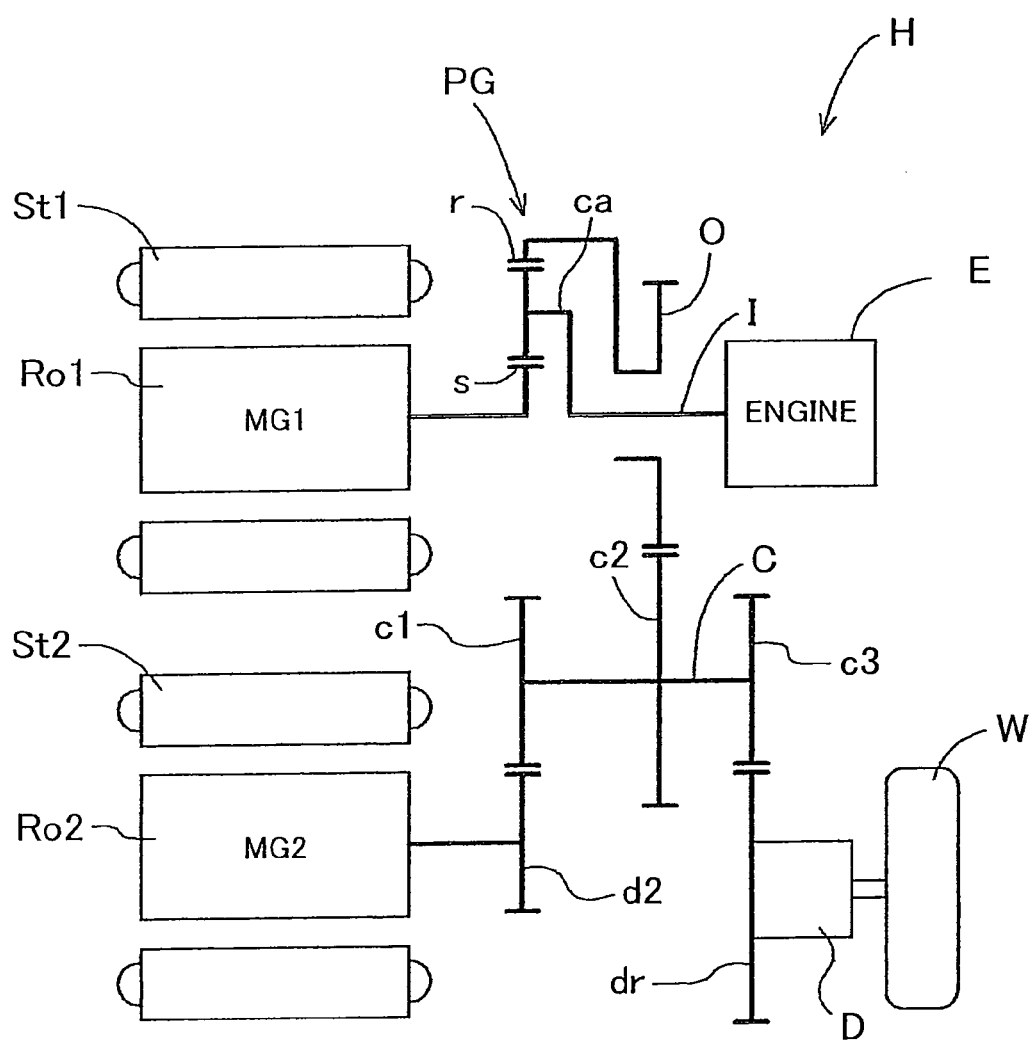
FIG. 1 is a skeleton view showing a mechanical configuration of a hybrid drive device according an embodiment of the present invention.
Figure 2:
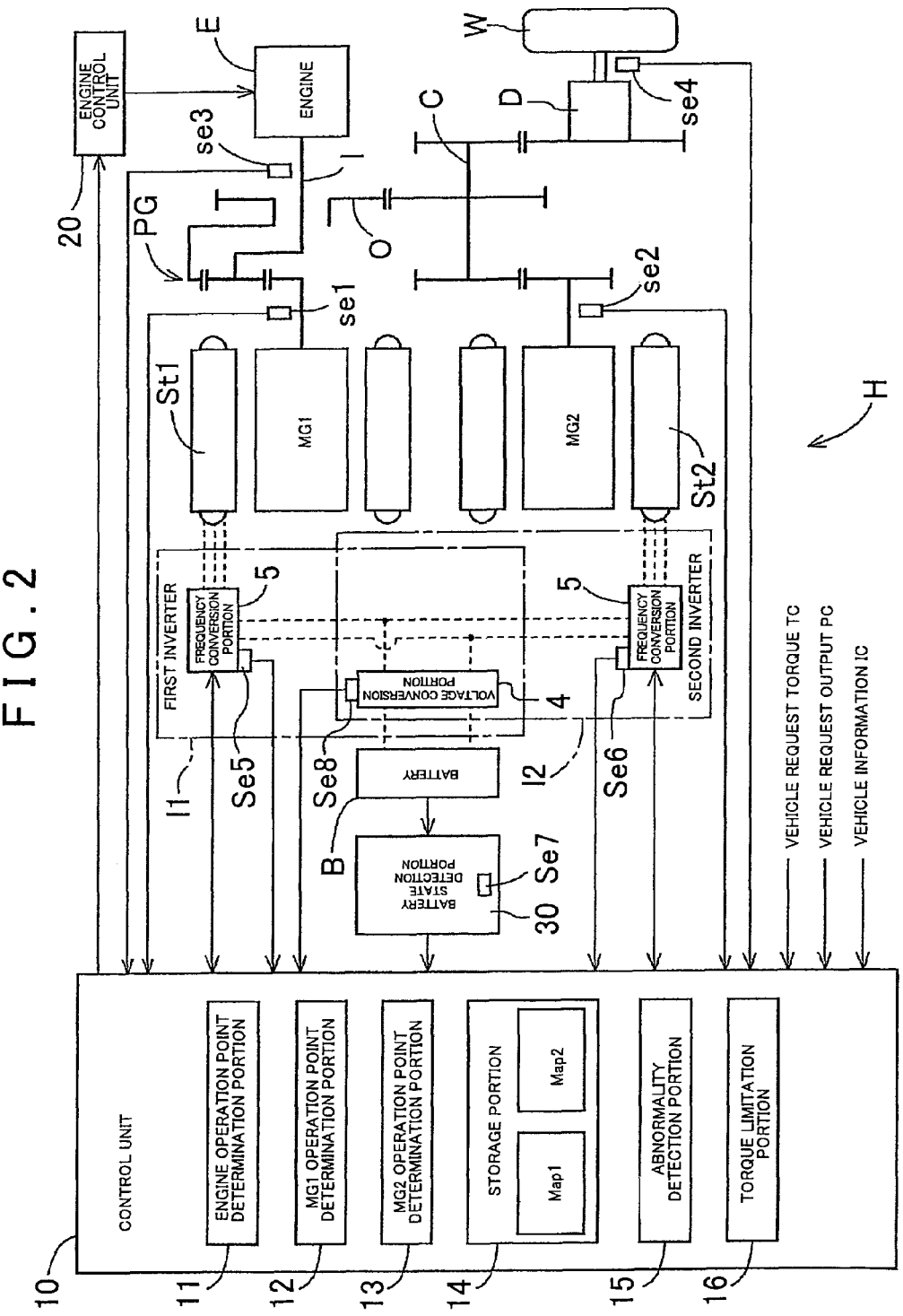
FIG. 2 is a block diagram showing a system configuration of the hybrid drive device.
Figure 3:
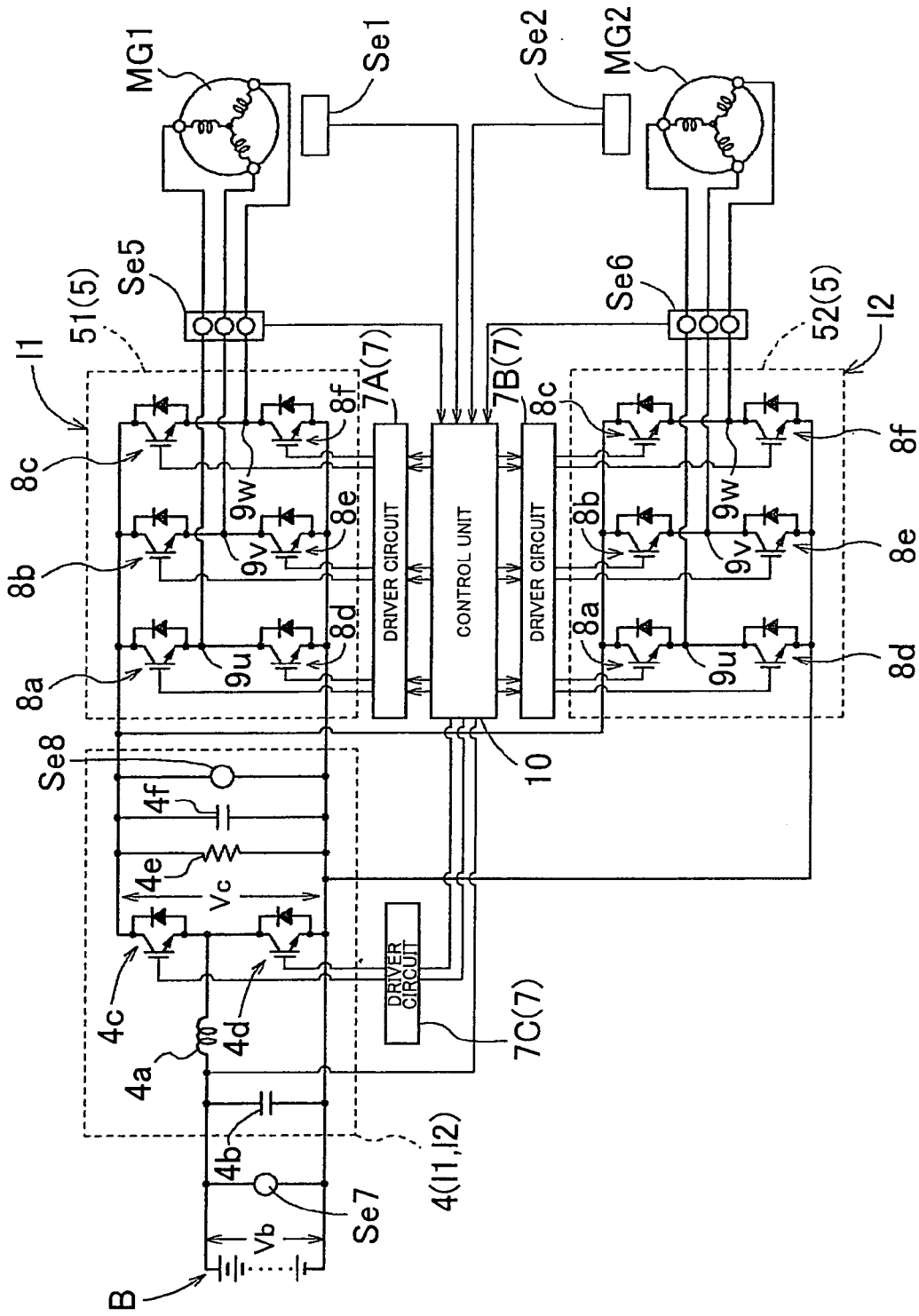
FIG. 3 is a block diagram showing a configuration of an electrical system of the hybrid drive device.

FIG. 1 is a skeleton view showing a mechanical configuration of the hybrid drive device H. FIG. 2 is a block diagram showing a system configuration of the hybrid drive device H. Note that, in FIG. 2, dotted lines show transmission routes of electric power, and solid line arrows show transmission routes of various information. FIG. 3 is an illustrative view showing a configuration of a rotating electrical machine electrical system of the hybrid drive device H.

As shown in FIG. 1, the hybrid drive device H is structured as the hybrid drive device H having a so-called two-motor split system which includes an engine E and two motor generators MG1 and MG2 as drive power sources and includes a power distribution planetary gear device PG which distributes an output of the engine E to the first motor generator MG1 side and to the wheel and second motor generator MG2 side.

That is, the hybrid drive device H includes, as the mechanical configuration, an input shaft I connected to the engine E, the first motor generator MG1, the second motor generator MG2, the power distribution planetary gear device PG, a counter gear mechanism C, and a differential device D which distributes the driving force to a plurality of wheels W. The planetary gear device PG distributes the output (driving force) of the engine E to the first motor generator MG1 and a counter drive gear O. The counter drive gear O is connected to the wheel W via the counter gear mechanism C and the differential device D. The second motor generator MG2 is connected to be capable of transmitting an output torque to a power transmission system which is from the counter drive gear O up to the differential device D. Specifically, the second motor generator MG2 is connected to the counter gear mechanism C, and is connected to the counter drive gear O and the differential device D via the counter gear mechanism C. In this embodiment, the first motor generator MG1 corresponds to a "first rotating electrical machine" according to an aspect of the present invention, and the second motor generator MG2 corresponds to a "second rotating electrical machine" according to an aspect of the present invention.

The hybrid drive device H includes, as an electrical system configuration, a first inverter I1 for performing a drive control of the first motor generator MG1, a second inverter I2 for performing a drive control of the second motor generator MG2, a battery B which supplies electric power to the first motor generator MG1 and the second motor generator MG2 via the first inverter I1 and the second inverter I2, and a control unit 10 which performs control of respective portions of the hybrid drive device H. The battery B corresponds to a "DC power supply" according to an aspect of the present invention.

Hereinafter, configurations of the respective portions of the hybrid drive device H will be described in order.

1-1. Mechanical Configuration

First, the mechanical configuration of the hybrid drive device H will be described. As shown in FIG. 1, in the hybrid drive device H, the input shaft I connected to the engine E, the first motor generator MG1, and the power distribution planetary gear device PG are arranged coaxially. The second motor generator MG2, the counter gear mechanism C, and the differential device D are arranged respectively on axes parallel to the input shaft I. As the engine E, various known internal combustion engines such as a gasoline engine or a diesel engine may be used. To a shaft of the counter gear mechanism C (counter shaft), a first counter driven gear c1, a second counter driven gear c2, and a differential pinion gear c3 are fixed in order from the first motor generator MG1 and second motor generator MG2 side. The differential pinion gear c3 meshes with a differential ring gear dr of the differential device D, and is structured to transmit the rotation of the counter gear mechanism C to the wheel W via the differential device D. The differential device D is used generally, and is structured to include, for example, a differential gear mechanism using a plurality of bevel gears meshing with each other.

The first motor generator MG1 includes a stator St1 fixed to a case (not shown) and a rotor Ro1 rotatably supported inside the stator St1 in the radial direction. The rotor Ro1 of the first motor generator MG1 is connected to rotate integrally with a sun gear s of the planetary gear device PG. The second motor generator MG2 includes a stator St2 fixed to a case (not shown) and a rotor Ro2 rotatably supported inside the stator St2 in the radial direction. The rotor Ro2 of the second motor generator MG2 is connected to rotate integrally with a second motor generator output gear d2 (hereinafter called "MG2 output gear"). The MG2 output gear d2 meshes with the first counter driven gear c1 fixed to the counter gear mechanism C, and is structured to transmit the rotation of the second motor generator MG2 to the counter gear mechanism C. Accordingly, the rotor Ro2 of the second motor generator MG2 rotates at a rotational speed proportional to rotational speeds of the counter gear mechanism C and the counter drive gear O. In the hybrid drive device H, the first motor generator MG1 and the second motor generator MG2 are AC motors for which drive controls are performed respectively by the first inverter I1 and the second inverter I2.

In this example, the first motor generator MG1 functions mainly as a generator which performs electricity generation by the driving force input via the sun gear s, charges the battery B, or supplies electric power for driving the second motor generator MG2. Note that there are cases where the first motor generator MG1 functions as a motor which performs power running to output the driving force during high-speed driving of a vehicle, at a start of the engine E, or the like. On the other hand, the second motor generator MG2 functions mainly as a motor which assists the driving force for driving of the vehicle. Note that there are cases where the second motor generator MG2 functions as a generator which performs regeneration using an inertia force of the vehicle as electrical energy during deceleration of the vehicle or the like. The operations of the first motor generator MG1 and the second motor generator MG2 are controlled by the first inverter I1 and the second inverter I2 which operate in accordance with a control instruction from the control unit 10.

At a start of a vehicle which is an issue in an embodiment of the present invention, the second motor generator MG2 operates as the motor. Thus, the torque control of the second motor generator MG2 and consequently a regeneration permission becomes an issue.

As shown in FIG. 1, the planetary gear mechanism PG is structured by a single-pinion type planetary gear mechanism arranged coaxially with the input shaft I. That is, the planetary gear device PG includes, as rotational components, a carrier ca supporting a plurality of pinion gears and the sun gear s and a ring gear r respectively meshing with the pinion gears. The sun gear s is connected to rotate integrally with the rotor Ro1 of the first motor generator MG1. The carrier ca is connected to rotate integrally with the input shaft I. The ring gear r is connected to rotate integrally with the counter drive gear O. The counter drive gear O meshes with the second counter driven gear c2 fixed to the counter gear mechanism C, and is structured to transmit the rotation of the ring gear r of the planetary gear device PG to the counter gear mechanism C. In this embodiment, the planetary gear device PG corresponds to a "differential gear device" according to an aspect of the present invention, and the sun gear s, the carrier ca, and the ring gear r respectively correspond to a "first rotational component," a "second rotational component," and a "third rotational component" of the differential gear device according to an aspect of the present invention.

1-2. Basic Operation of Hybrid Drive Device

Next, the basic operation of the hybrid drive device H according to this embodiment will be described. FIGS. 4 and 5 are velocity diagrams showing operation states of the power distribution planetary gear device PG. In the velocity diagrams, a plurality of vertical lines arranged in parallel respectively correspond to the rotational components of the planetary gear device PG, and reference symbols "s," "ca," and "r" shown above the respective vertical lines respectively correspond to the sun gear s, the carrier ca, and the ring gear r. Positions on these vertical lines correspond to the rotational speeds of the respective rotational components. A zero rotational speed is shown by the abscissa, with respect to which the upper side is positive and the lower side is negative. An interval between the vertical lines corresponding to the respective rotational components correspond to a gear ratio $\lambda$ (gear ratio of the sun gear and the ring gear which equals the number of teeth of the sun gear divided by the number of teeth of the ring gear) of the planetary gear device PG. In the planetary gear device PG, the carrier ca is connected to rotate integrally with the engine E and the input shaft I, the sun gear s is connected to rotate integrally with the rotor Ro1 of the first motor generator MG1, and the ring gear r is connected to rotate integrally with the counter drive gear O as an output member. Thus, the rotational speed of the carrier ca coincides with an engine rotational speed NE which is the rotational speed of the engine E and the input shaft I, the rotational speed of the sun gear s coincides with an MG1 rotational speed N1 which is the rotational speed of the first motor generator MG1, and the rotational speed of the ring gear r coincides with an output rotational speed No which is the rotational speed of the counter drive gear O. Therefore, using the gear ratio $\lambda$ of the planetary gear device PG, a rotational speed relational expression (expression 1) below is obtained among the engine rotational speed NE, the MG1 rotational speed N1, and the output rotational speed No.

$$NE=(No+\lambda \cdot N1)/(\lambda+1) \qquad \text{(Expression 1)}$$

In the velocity diagrams of FIGS. 4 and 5, a white triangle, a white circle, and a white star respectively show the engine rotational speed NE, the MG1 rotational speed N1, and the output rotational speed No. Arrows adjacent to the respective rotational components respectively show an engine torque TE which is the torque of the engine E applied to the carrier ca, an MG1 torque T1 which is the torque of the first motor generator MG1 applied to the sun gear s, an MG2 torque T2 which is the torque of the second motor generator MG2 applied to the ring gear r, and a drive torque To which is the torque from the wheel W (torque required for driving the vehicle) applied to the ring gear r. Note that an upward arrow shows the torque in the positive direction, and a downward arrow shows a torque in the negative direction. As shown in FIGS. 4 and 5, the counter drive gear O (ring gear r) shown by the white star is applied with not only the drive torque To from the wheel W via the differential device D and the counter gear mechanism C but also the output torque of the second motor generator MG2 via the counter gear mechanism C. Using the gear ratio $\lambda$ of the planetary gear device PG, a torque relational expression (expression 2) below is obtained among the engine torque TE, the MG1 torque T1, the MG2 torque T2, and the drive torque To.

$$TE:T1:(T2+To)=(1+\lambda):(-\lambda):(-1) \qquad \text{(Expression 2)}$$

FIG. 4 shows the velocity diagram in a hybrid drive mode of driving with the output torques of both the engine E and the two motor generators MG1 and MG2. In this mode, the engine E outputs the engine torque TE in the positive direction in accordance with the requested driving force (a vehicle request torque TC and a vehicle request output PC described later) from the vehicle side while being controlled to maintain a state where the efficiency is high and the discharge of gas is low (to generally comply with an optimal fuel consumption characteristic), and the engine torque TE is transmitted to the carrier ca via the input shaft I. The first motor generator MG1 functions as a reaction force receiver which supports the reaction force of the engine torque TE by outputting the MG1 torque T1 in the negative direction to transmit the MG1 torque T1 to the sun gear s. Accordingly, the planetary gear device PG distributes the engine torque TE to the first motor generator MG1 and the counter drive gear O on the wheel W side. The second motor generator MG2 outputs the MG2 torque T2 appropriately in the positive direction or the negative direction to assist the driving force distributed to the counter drive gear O in accordance with the requested driving force, the driving state of the vehicle, or the like.

FIG. 5 shows the velocity diagram in an EV (electric) drive mode of driving only with the output torque of the second motor generator MG2. In this mode, the second motor generator MG2 outputs the MG2 torque T2 in accordance with the requested driving force from the vehicle side. That is, in the case where the driving force is requested in a direction for acceleration or cruise of the vehicle, the second motor generator MG2 outputs the MG2 torque T2 in the positive direction while rotating in the positive direction to perform power running to accelerate the vehicle against the drive torque To corresponding to a driving resistance applied to the counter drive gear O in the negative direction, as shown by solid line arrows in FIG. 5. On the other hand, in the case where the driving force is requested in a direction for deceleration of the vehicle, the second motor generator MG2 outputs the MG2 torque T2 in the negative direction while rotating in the positive direction to perform regeneration (electricity generation) to decelerate the vehicle against the drive torque To corresponding to the inertia force applied to the counter drive gear O in the positive direction, as shown by dotted line arrows in FIG. 5. At the start of the vehicle, the operation of the hybrid drive device H basically comes into progress in this state.

In the EV drive mode, the first motor generator MG1 is controlled such that the MG1 torque T1 becomes zero. Thus, the sun gear s is freely rotatable by the MG2 torque T2 without the rotation being inhibited. Accordingly, the first motor generator MG1 provides the negative MG1 rotational speed N1 (rotates in the negative direction). The engine E is in a stopped state in which fuel supply is stopped, and further, the engine rotational speed NE is brought to zero by a friction force inside the engine E. That is, in the planetary gear device PG in the EV drive mode, the counter drive gear O and the ring gear r connected with the second motor generator MG2 rotate in the positive direction (provides a positive rotational speed) and the sun gear s connected with the first motor generator MG1 rotates in the negative direction (provides a negative rotational speed) with the carrier ca being a supporting point.

1-3. System Configuration

Next, the system configuration of the hybrid drive device H will be described. As shown in FIGS. 2 and 3, in the hybrid drive device H, the first inverter I1 (more specifically, a voltage conversion portion 4 and a frequency conversion portion 51 (5)) for performing the drive control of the first motor generator MG1 is electrically connected to a coil of the stator St1 of the first motor generator MG1. The second inverter I2 (more specifically, the voltage conversion portion 4 and a frequency conversion portion 52 (5)) for performing the drive control of the second motor generator MG2 is electrically connected to a coil of the stator St2 of the second motor generator MG2. The first inverter I1 and the second inverter I2 are electrically connected with each other, and are electrically connected to the battery B. The first inverter I1 converts DC electric power supplied from the battery B or DC electric power generated by the second motor generator MG2 and converted to and supplied as direct current by the second inverter I2 into AC electric power and supplies the AC electric power to the first motor generator MG1. The first inverter I1 converts the electric power generated by the first motor generator MG1 from alternating current to direct current and supplies the electric power to the battery B or the second inverter I2. In a similar manner, the second inverter I2 converts DC electric power supplied from the battery B or DC electric power generated by the first motor generator MG1 and converted to and supplied as direct current by the first inverter I1 into AC electric power and supplies the AC electric power to the second motor generator MG2. The second inverter I2 converts the electric power generated by the second motor generator MG2 from alternating current to direct current and supplies the electric power to the battery B or the first inverter I1. As shown in FIG. 2, the first inverter I1 and the second inverter I2 are provided with the voltage conversion portion 4 (converter), and are structured to increase the voltage from the battery B and supply the voltage to the frequency conversion portion 5 (inverter) side in the case where a voltage increase by the voltage conversion portion 4 is necessary in relation to the rotational speed or the torque required for the respective motor generators MG1 and MG2. In the case where the motor generator MG1 or MG2 performs regeneration to charge the battery B, the voltage is decreased in contrast.

The first inverter I1 and the second inverter I2 control electric current values, frequencies and phases of alternating current waves, and the like supplied to each of the first motor generator MG1 and the second motor generator MG2 in accordance with a control signal from the control unit 10. Accordingly, the first inverter I1 and the second inverter I2 perform the drive controls of the first motor generator MG1 and the second motor generator MG2 to achieve the output torque and the rotational speed in accordance with the control signal from the control unit 10.

The voltage conversion portion 4 controls a voltage value provided from the battery B to the frequency conversion portion 5 also in accordance with the control signal from the control unit 10. The voltage value provided to the frequency conversion portion 5 is set and controlled to a voltage value on a higher side of the respective operation points of the first motor generator MG1 and the second motor generator MG2 which can ensure the operations of the respective motor generators MG1 and MG2 at the operation points.

The battery B is electrically connected to the first inverter I1 and the second inverter I2. The battery B is structured by, for example, a nickel-hydrogen secondary battery or a lithium-ion secondary battery. The battery B supplies DC electric power to the first inverter I1 and the second inverter I2, and is charged by DC electric power generated by the first motor generator MG1 or the second motor generator MG2 and supplied via the first inverter I1 or the second inverter I2. The hybrid drive device H includes a battery state detection portion 30 as a battery state detection unit which detects a state of the battery B. The battery state detection portion 30 includes various sensors such as a voltage sensor Se7 which detects the voltage between positive and negative electrodes of the battery B as well as an electric current sensor and a temperature sensor, and detects a battery voltage and a state of charge (SOC) of the battery. Information on the detection result of the battery state detection portion 30 is output to the control unit 10.

The hybrid drive device H includes a first motor generator rotational speed sensor Se1 (hereinafter called "MG1 rotational speed sensor"), a second motor generator rotational speed sensor Se2 (hereinafter called "MG2 rotational speed sensor"), an engine rotational speed sensor Se3, and a vehicle speed sensor Se4. Further, the first inverter I1 and the second inverter I2 respectively include electric current sensors Se5 and Se6, the battery state detection portion 30 includes the voltage sensor Se7, and the voltage conversion portion 4 includes a voltage sensor Se8.

The MG1 rotational speed sensor Se1 is a sensor which detects the MG1 rotational speed N1 which is the rotational speed of the rotor Ro1 of the first motor generator MG1. The MG2 rotational speed sensor Se2 is a sensor which detects an MG2 rotational speed N2 which is the rotational speed of the rotor Ro2 of the second motor generator MG2. The engine rotation speed sensor Se3 is a sensor which detects the engine rotational speed NE which is the rotational speed of a crankshaft or the input shaft I of the engine E. The vehicle speed sensor Se4 is a sensor which detects the rotational speed of the wheel W, i.e., a vehicle speed. The electric current sensors Se5 and Se6 are sensors which detect electric currents flowing respectively in the first motor generator MG1 and the second motor generator MG2. The voltage sensor Se7 is a sensor which detects a voltage Vb between both terminals of the battery B. The voltage sensor Se8 is a sensor which detects a voltage Vc applied to a smoothing capacitor 4f. The rotational speed sensors Se1 to Se4 are structured by, for example, a resolver or a whole IC. The detection results of the respective sensors Se1 to Se8 are output to the control unit 10.

FIG. 3 is a block diagram schematically showing the configuration of the rotating electrical machine control electrical system.

The rotating electrical machine control electrical system includes the voltage conversion portion 4 and the frequency conversion portion 5 from the battery B side, as illustrated in FIG. 2. As the frequency conversion portion 5 in this embodiment, the frequency conversion portions 51 and 52 are provided separately for each of one pair of the motor generators MG1 and MG2. Between the frequency conversion portions 5 and the respective motor generators MG1 and MG2, the electric current sensors Se5 and Se6 for measuring the electric currents flowing in the motor generators are provided. Note that the battery B is capable of supplying electric power to the motor generators MG1 and MG2, and is capable of receiving and storing supply of electric power from the motor generators MG1 and MG2.

The voltage conversion portion 4 is structured to include a reactor 4a, a filter capacitor 4b, a pair of upper and lower switching elements 4c and 4d, a discharging resistor 4e, and the smoothing capacitor 4f. The smoothing capacitor 4f is provided with the voltage sensor Se8 which detects the voltage between terminals thereof. As the switching elements 4c and 4d, an insulated gate bipolar transistor (IGBT) or a metal oxide semiconductor field effect transistor (MOSFET) is preferably used. In this embodiment, an example where the IGBT is used is described.

The source of the switching element 4c on the upper side of the voltage conversion portion 4 is connected to the drain of the switching element 4d on the lower side, and is connected to the plus side of the battery B via the reactor 4a. The drain of the switching element 4c on the upper side is connected to the input plus side of the frequency conversion portion 5. The source of the switching element 4d on the lower side is connected to the minus side of the battery B (ground). Since the input minus side of the frequency conversion portion 5 is also the ground, the source of the switching element 4d on the lower side is connected with the input minus side of the frequency conversion portion 5.

The gates of the switching element 4c on the upper side and the switching element 4d on the lower side are connected to the control unit 10 via a driver circuit 7 (7C). The switching elements 4c and 4d are controlled by the control unit 10, and increase the voltage from the battery B to supply the voltage to the frequency conversion portion 5. The control unit 10 controls the switching elements 4c and 4d based on a boost command value set in accordance with the requested torque requested for the motor generator. Specifically, the control unit 10 brings the switching element 4c on the upper side to an off-state, switches on/off of the switching element 4d on the lower side by, for example, performing a PWM control, and increases and outputs the voltage of the battery B. In the case where the motor generator performs a regeneration operation, the voltage conversion portion 4 regenerates the electric power generated by the motor generator to the battery B. For example, the control unit 10 regenerates electric power via the voltage conversion portion 4 by bringing the switching element 4d on the lower side to an off-state and controlling the switching element 4c on the upper side in an on-state. Note that, in the case of decreasing the electric power generated by the motor generator and regenerating the electric power to the battery B, the PWM control may be performed for the switching element 4c on the upper side.

The frequency conversion portion 5 is structured by a bridge circuit. Two switching elements are connected in series between the input plus side and the input minus side of the frequency conversion portion 5, and three of these series circuits are connected in parallel. That is, the bridge circuit is structured such that one set of the series circuit corresponds to each of stator coils of a U-phase, a V-phase, and a W-phase of the motor generators MG1 and MG2. In FIG. 3, reference numeral 8a denotes a U-phase upper-side switching element, reference numeral 8b denotes a V-phase upper-side switching element, reference numeral 8c denotes a W-phase upper-side switching element, reference numeral 8d denotes a U-phase lower-side switching element, reference numeral 8e denotes a V-phase lower-side switching element, and reference numeral 8f denotes a W-phase lower side-switching element. Note that the IGBT or MOSFET is preferably used also for the switching elements 8a to 8f of the frequency conversion portion 5. In this embodiment, a case where the IGBT is used is shown as an example.

As shown in FIG. 3, the drains of the upper-side switching elements 8a, 8b, and 8c of the respective phases are connected to the output plus side of the voltage conversion portion 4 (input plus side of the frequency conversion portion 5), and the sources are connected to the drains of the lower-side switching elements 8d, 8e, and 8f of the respective phases. The sources of the lower-side switching elements 8d, 8e, and 8f of the respective phases are connected to the output minus side of the voltage conversion portion 4 (input minus side of the frequency conversion portion 5), i.e., the minus side of the battery B (ground). The gates of the respective switching elements 8a to 8f are connected to the control unit 10 via the driver circuit 7 (7A and 7B), and are respectively and independently controlled so as to switch.

Middle points (connection points of switching elements) 9u, 9v, and 9w of the series circuits between pairs of the switching elements (8a and 8d, 8b and 8e, and 8c and 8f) of the respective phases are respectively connected to stator wirings of the U-phase, the V-phase, and the W-phase of the motor generators MG1 and MG2. The drive currents supplied to the respective windings are detected by the electric current sensors Se5 and Se6. Detection values of the electric current sensors Se5 and Se6 are received by the control unit 10 and used for feedback control.

The motor generators MG1 and MG2 include the rotational speed sensors Se1 and Se2 such as a resolver functioning as a part of a rotation detection portion, and detect rotation angles (mechanical angles) of the rotors Ro1 and Ro2. The rotational speed sensors Se1 and Se2 are set in accordance with the numbers of polarities (the number of pole pairs) of the rotors Ro1 and Ro2, and are capable of converting the rotation angle of the rotor Ro1 or rotor Ro2 to an electric angle θ and outputting a signal in accordance with the electric angle θ. The control unit 10 calculates the rotational speeds (angular speeds ω) of the motor generators MG1 and MG2 or control timings of the respective switching elements 8a to 8f of the frequency conversion portion 5 based on the rotation angles.

By performing the PWM controls of the switching elements 8a to 8f based on control operation points (control rotational speeds and control torques as targets of control) with respect to the motor generators MG1 and MG2, the control unit 10 supplies a three-phase AC drive current to the respective motor generators MG1 and MG2. Accordingly, the respective motor generators MG1 and MG2 perform power running in accordance with the target rotational speeds and torques. In the case where the motor generators MG1 and MG2 operate as generators and receive electric power from the motor generator side, the control unit 10 controls the frequency conversion portion 5 to convert alternating current of a predetermined frequency to direct current.

1-4. Configuration of Control Unit

Returning to FIG. 2, the control unit 10 performs operation controls of the respective portions of the hybrid drive device H. In this embodiment, the control unit 10 includes an engine operation point determination portion 11, a first motor generator operation point determination portion 12 (hereinafter called "MG1 operation point determination portion"), a second motor generator operation point determination portion 13 (hereinafter called "MG2 operation point determination portion"), a storage portion 14, an abnormality detection portion 15, and a torque limitation portion 16.

The control unit 10 is structured to include one or more arithmetic processing devices, a storage medium such as a RAM or a ROM for storing software (program) or data, and the like. Each of the function portions 11 to 16 of the control unit 10 is structured such that a function portion for performing various processes with respect to input data is mounted with one or both of hardware and software as essential members of the arithmetic processing device.

The control unit 10 is connected to be capable of communicating with an engine control unit 20 which performs an operation control of the engine E. Further, as described above, the control unit 10 is structured to be input with the information on the detection result of the battery state detection portion 30 and information on other detection results of the respective sensors Se1 to Se8.

In this embodiment, the control unit 10 is structured to be input with the vehicle request torque TC, the vehicle request output PC, and vehicle information IC from the vehicle side.

The vehicle request torque TC is a torque requested to be transmitted to the wheel W in order to drive the vehicle appropriately in accordance with the operation of a driver. Thus, the vehicle request torque TC is determined according to a map or the like set in advance in accordance with operation amounts of an accelerator pedal and brake pedal of the vehicle and the vehicle speed detected by the vehicle speed sensor Se4.

The vehicle request output PC is an output (work rate) requested to be generated by the engine E in consideration of the state of charge of the battery B. Thus, the vehicle request output PC is determined according to a map or the like set in advance in accordance with the vehicle request torque TC, the vehicle speed detected by the vehicle speed sensor Se4, and the state of charge of the battery B detected by the battery state detection portion 30. In this embodiment, the vehicle request torque TC and the vehicle request output PC are determined as the torque or output to be transmitted to the counter drive gear O as the output member of the hybrid drive device H.

The vehicle information IC includes various information showing the state of the vehicle such as, for example, information showing a range (each range of "P," "D," "R," or the like) selected by a select lever of an automatic transmission, operation state of a parking brake, operation state of a main brake, or the like.

The engine operation point determination portion 11 performs a process of determining an engine operation point which is the operation point of the engine E. The engine operation point is a control command value showing the control operation point of the engine E and is determined by the rotational speed and the torque. The engine operation point determination portion 11 also performs determination of engine operation/stop on whether to operate or step the engine E. The determination of the engine operation/stop is performed according to a map or the like set in advance in accordance with the vehicle request torque TC and the vehicle speed detected by the vehicle speed sensor Se4. In the case where the engine E is determined to be operated, the engine operation point determination portion 11 determines the engine operation point. The engine operation point determination portion 11 outputs information of the determined engine operation point to the engine control unit 20. The engine control unit 20 performs control to operate the engine E with the torque and rotational speed shown by the engine operation point. On the other hand, in the case where the engine E is determined to be stopped, the engine operation point determination portion 11 outputs an instruction therefor to the engine control unit 20. Note that the stop instruction of the engine E may be an instruction of the engine operation point where an engine rotational speed command value and an engine torque command value are both zero.

Figure 6:
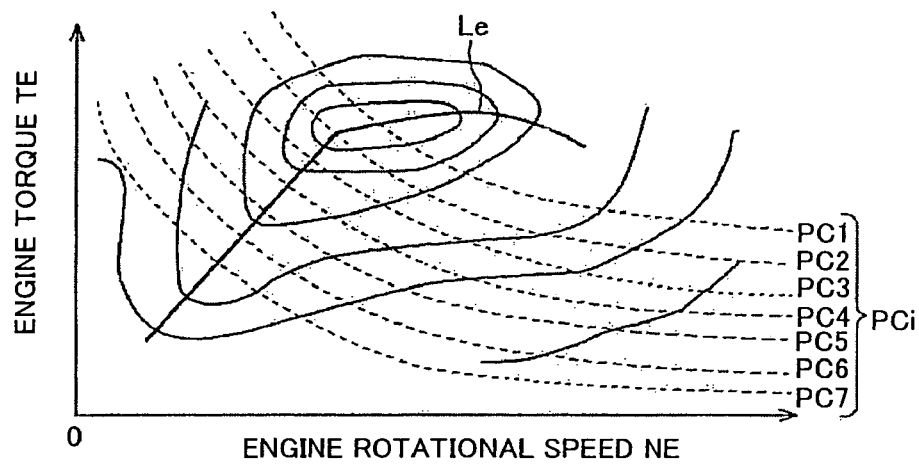
FIG. 6 is a view showing one example of an engine operation point map.

The engine operation point is the command value showing the control operation point of the engine E determined in consideration of the vehicle request output PC and the optimum fuel consumption, and is determined by the engine rotational speed command value and the engine torque command value. The determination of the engine operation point is performed based on an engine operation point map. FIG. 6 is a view showing one example of the engine operation point map. In the map, the ordinate shows the engine torque TE, and the abscissa shows the engine rotational speed NE. Also, in the map, a thin solid line shows an isoline of fuel consumption rate, and shows that the fuel consumption rate becomes higher (fuel efficiency becomes lower) toward the outside. A dotted line shows an iso-output line PCi (i=1, 2, 3, ...). A bold solid line shows an optimum fuel consumption line Le, and is a line connecting points at which the fuel consumption rate becomes lowest (fuel efficiency becomes highest) in the iso-output lines PCi. Thus, the engine operation point determination portion 11 determines the engine rotational speed NE and the engine torque TE at an intersection of the iso-output line PCi showing the same output as the vehicle request output PC and the optimum fuel consumption line Le as the engine rotational speed command value and the engine torque command value of the engine operation point. Note that, in FIG. 6, only seven iso-output lines PCi are shown for the sake of simplification, but a number of the iso-output lines PCi are preferably recorded with narrower intervals in the actual engine operation point map.

The MG1 operation point determination portion 12 performs a process of determining an MG1 operation point which is the operation point of the first motor generator MG1. The MG1 operation point is a control command value showing the control operation point of the first motor generator MG1 and is determined by the rotational speed and the torque. The control unit 10 controls the first inverter I1 to cause the first motor generator MG1 to operate with the torque and the rotational speed shown by the MG1 operation point determined by the MG1 operation point determination portion 12. The MG1 operation point is the command value showing the control operation point of the first motor generator MG1 determined based on the engine operation point determined as described above and the rotational speed of a rotational member connected to the wheel W side of the power distribution planetary gear device PG, and is determined by an MG1 rotational speed command value and an MG1 torque command value.

In this example, the MG1 operation point determination portion 12 calculates the output rotational speed No which is the rotational speed of the counter drive gear O at the vehicle speed based on the vehicle speed detected by the vehicle speed sensor Se4 and the gear ratio of the rotational members from the counter drive gear O to the wheel W. The MG1 operation point determination portion 12 determines, as the MG1 rotational speed command value, the MG1 rotational speed N1 calculated from the rotational speed relational expression (expression 1) by substitutions of the engine rotational speed NE which is the engine rotational speed command value of the engine operation point and the output rotational speed No. The MG1 operation point determination portion 12 determines the MG1 torque command value with the feedback control such as a proportional-integral control (PI control) based on a difference of rotational speed between the determined MG1 rotational speed command value and the MG1 rotational speed N1 of the first motor generator MG1 detected by the MG1 rotational speed sensor Se1. The determined MG1 rotational speed command value and the MG1 torque command value become the MG1 operation point. In the flowcharts shown in FIGS. 8 and 11, the MG1 operation point determined by the MG1 operation point determination portion 12 is described as a "determined operation point."

The MG2 operation point determination portion 13 performs a process of determining an MG2 operation point which is the operation point of the second motor generator MG2. The MG2 operation point is a control command value showing the control operation point of the second motor generator MG2 and is determined by the rotational speed and the torque. The control unit 10 controls the second inverter I2 to cause the second motor generator MG2 to operate with the torque and the rotational speed shown by the MG2 operation point determined by the MG2 operation point determination portion 13. The MG2 operation point is the control command value showing the control operation point of the second motor generator MG2 determined based on the vehicle request torque TC, the engine operation point, and the MG1 operation point, and is determined by an MG2 rotational speed command value and an MG2 torque command value. By modifying the torque relational expression (expression 2), a torque relational expression (expression 3) below is introduced.

$$T2 = -To - TE/(1+\lambda) \qquad \text{(Expression 3)}$$

The MG2 operation point determination portion 13 determines, as the MG2 torque command value, the MG2 torque T2 calculated by substitutions of the vehicle request torque TC as a torque "−To" in the opposite direction from the drive torque To and the engine torque command value of the engine operation point as the engine torque TE. Accordingly, a torque complementing excess or deficiency of the torque transmitted to the counter drive gear O from the engine E with respect to the vehicle request torque TC can be generated by the second motor generator MG2. Since the MG2 rotational speed N2 which is the rotational speed of the second motor generator MG2 is constantly proportional to the vehicle speed, the MG2 rotational speed command value is determined automatically in accordance with the vehicle speed detected by the vehicle speed sensor Se4. By the determined MG2 rotational speed command value and the MG2 torque command value, the MG2 operation point is determined. Note that, as described above, since the MG2 rotational speed command value is determined automatically in accordance with the vehicle speed, the torque control of the second motor generator MG2 is basically performed according to the MG2 torque command value of the MG2 operation point. In the flowcharts shown in FIGS. 8 and 11, the MG2 operation point determined by the MG2 operation point determination portion 13 is described as the "determined operation point."

In the hybrid drive device H, the first motor generator MG1 mainly functions as the generator. That is, as shown in FIG. 4, in the hybrid drive mode in which the engine E is in operation, the first motor generator MG1 outputs the torque in the negative direction in order to receive the reaction force of the engine torque TE and transmit the engine torque TE to the ring gear r and the counter drive gear O. At this time, in the case where the MG1 rotational speed N1 is positive (the rotation is positive), the first motor generator MG1 performs regeneration (electricity generation) to function as the generator. In the case where the MG1 rotational speed N1 is negative (the rotation is negative), the first motor generator MG1 performs power running to function as the motor. In either case, the first motor generator MG1 outputs the torque in the negative direction. As shown in FIG. 5, in the EV drive mode in which the engine E is in the stopped state, the first motor generator MG1 is controlled such that the MG1 torque T1 becomes zero and is in a freely rotatable state.

Figure 7:
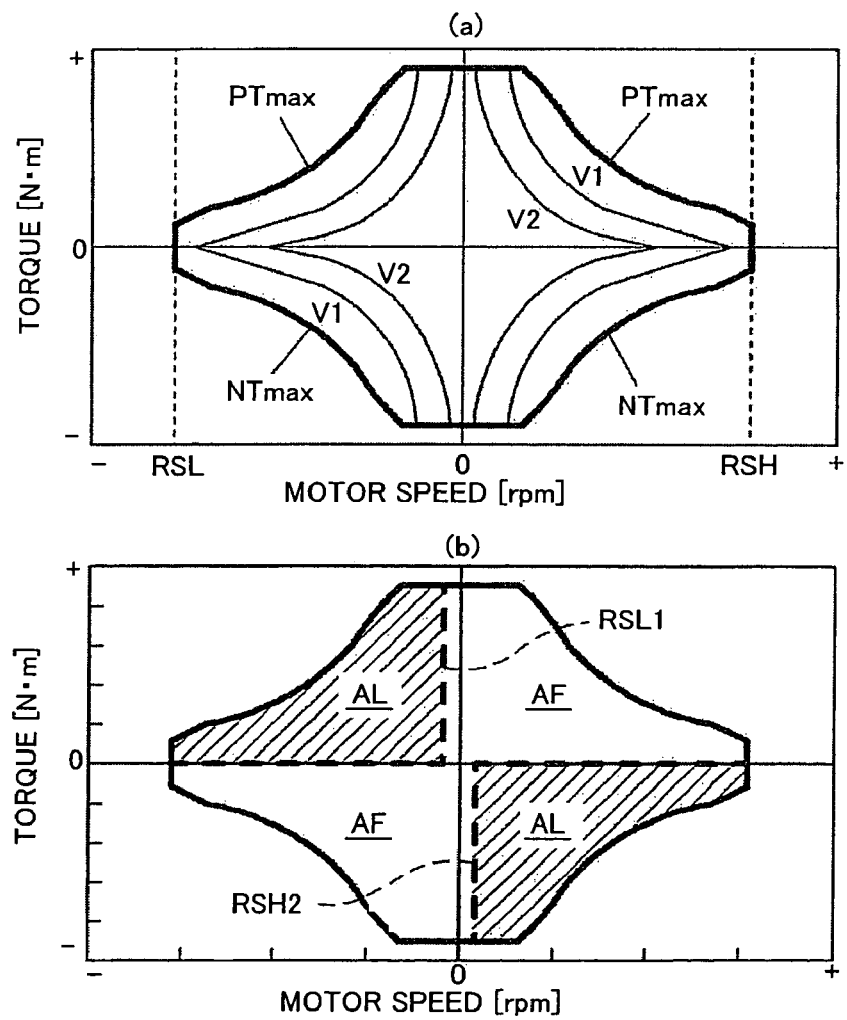
FIGS. 7A and 7B are maps respectively showing correlations between a rotational speed and a torque of a rotating electrical machine in a normal state and in an abnormal state.

The storage portion 14 stores rotating electrical machine control maps Map1 and Map2 as shown in FIGS. 7A and 7B. The rotating electrical machine control maps Map1 and Map2 are correlation maps showing the correlation between the rotational speed and the torque of the motor generator, and show the correlation between the rotational speeds and the torques which can be output at the rotational speeds of the motor generators MG1 and MG2. Within a range of a solid line shown in FIGS. 7A and 7B, the motor generators MG1 and MG2 are operable. The hybrid drive device H is structured such that the operation points of the motor generators MG1 and MG2 described above also fall within this range.

The rotating electrical machine control map Map1 shown in FIG. 7A is a control map showing a region in which the motor generators MG1 and MG2 are operable in a state where the hybrid drive device H is operating normally. The rotating electrical machine control map Map2 shown in FIG. 7B is a control map showing a region in which the motor generators MG1 and MG2 are operable in an abnormal state where an abnormality of some kind has occurred in the voltage conversion portion 4. The latter map Map2 will be described later in detail.

Returning to the rotating electrical machine control map Map1, the normal state will be further described.

The hybrid drive device H according to an embodiment of the present invention includes the voltage conversion portion 4, and is capable of increasing the voltage of the battery B which supplies driving electric power to the motor generators MG1 and MG2 and causing the rotational speed for shifting to a weak field control to shift to a higher rotational speed. In this embodiment, the voltage of the battery B is increased to voltages V2 or V1, the voltage V2 being lower. In FIG. 7A, a line of the voltage V2 shows a boundary at which the voltage after the voltage increase by the voltage conversion portion 4 needs to be the voltage V2. That is, it shows the boundary at which the voltage V2 is set as a boost command value. In a similar manner, lines of the voltage V1 respectively show boundaries at which the voltage after the voltage increase by the voltage conversion portion 4 needs to be the voltage V1. Thus, in a state where the voltage conversion portion 4 and the frequency conversion portion 5 operate normally, the respective motor generators MG1 and MG2 are operated with the control operation points (rotational speeds and torques) being set within the region of the solid line. At this time, the voltage value necessary for boost control is determined based on the map.

As can be seen from FIG. 7A, the torque is variable from a negative-side maximum torque NTmax up to a positive-side maximum torque PTmax while the rotational speed is between a lower limit value RSL and an upper limit value RSH acceptable by the motor generators MG1 and MG2. Regarding the power running and regeneration, the power running is performed in first and third quadrants, and the regeneration is performed in second and fourth quadrants.

Returning to FIG. 2, the abnormality detection portion 15 detects an abnormality described above which requires the voltage conversion portion 4 to be stopped. As a representative example, in a similar manner to the related art described above, the abnormality is detected by whether the boost voltage Vc from the voltage sensor Se8 coincides with a boost value (value in which a battery voltage Vb obtained from the voltage sensor Se7 is multiplied by a duty cycle of the PWM control for the voltage increase) obtained in relation to the operation points of the first motor generator MG1 and the second motor generator MG2. That is, the voltage conversion portion 4 is operating normally in the case of a coincidence, and the abnormality (failure) is detected in the case of a non-coincidence. In this manner, in the case where the abnormality of the voltage conversion portion 4 is detected by the abnormality detection portion 15, the operation of the voltage conversion portion 4 is stopped.

The description above regards both the first motor generator MG1 and the second motor generator MG2 as the motor generators. In contrast, the problem at the start of the vehicle which is an issue in an embodiment of the present invention occurs in relation to the second motor generator MG2 in the case of, for example, attempting to start the vehicle using a motor in the EV mode. Thus, as the motor generator, the second motor generator MG2 will mainly be described below as the issue.

The torque limitation portion 16 limits the output torque of the motor generator MG2 in the case where the abnormality detection portion 15 detects the abnormality requiring the voltage conversion portion 4 to be stopped. Specifically, the generation of a positive torque is limited in a region below a rotational speed lower limit threshold value RSL1 where the rotational speed of the motor generator MG2 is below zero, and a region in which the positive torque is generated is limited to a region of the rotational speed lower limit threshold value RSL1 or greater. On the other hand, the generation of a negative torque is limited in a region above a rotational speed upper limit threshold value RSH2 where the rotational speed of the motor generator MG2 is greater than zero, and a region in which the negative torque is generated is limited to a region of the rotational speed upper limit threshold value RSH2 or less. In other words, in the region where the rotational speed of the motor generator MG2 takes a negative value of less than the rotational speed lower limit threshold value RSL1, the generation of the positive torque is inhibited and the regeneration is inhibited. In the region where the rotational speed of the motor generator MG2 takes a positive value of greater than the rotational speed upper limit threshold value RSH2, the generation of the negative torque is inhibited and the regeneration is inhibited in a similar manner.

In the rotating electrical machine control map Map2 shown in FIG. 7B described above, the rotational speed lower limit threshold value RSL1 and the rotational speed upper limit threshold value RSH2 are shown in bold dotted lines.

In this embodiment, the rotational speed lower limit threshold value RSL1 and the rotational speed upper limit threshold value RSH2 are both fixed values. Thus, in a state where the motor generator MG2 generates the positive torque, the rotational speed is changeable from the rotational speed lower limit threshold value RSL1 up to the maximum value RSH of the rotational speed, and the torque is acceptable from zero up to the positive-side maximum torque PTmax in this state. On the other hand, in a state where the motor generator MG2 generates the negative torque, the rotational speed is changeable from the minimum value RSL of the rotational speed up to the rotational speed upper limit threshold value RSH2, and the torque is acceptable from zero up to the negative-side maximum torque NTmax in this state.

Hereinafter, the meanings of the rotational speed lower limit threshold value RSL1 and the rotational speed upper limit threshold value RSH2 will be described with an example of a case where the motor generator MG2 executes the regeneration operation. This state corresponds to a braking/starting at a downhill. In the configuration according to an embodiment of the present invention, the smoothing capacitor 4f is provided between the voltage conversion portion 4 and the frequency conversion portion 5. In the case where the smoothing capacitor 4f is charged with electric power which is to be returned to the battery B side from the motor generator MG2 by a brake operation in a state where the operation of the voltage conversion portion 4 is stopped, there is a possibility of the voltage of the smoothing capacitor 4f exceeding the withstand voltage if the electric power amount charged in the smoothing capacitor 4f is too large. Thus, as threshold values which enable the voltage to be maintained at the withstand voltage or less, the rotational speed lower limit threshold value RSL1 and the rotational speed upper limit threshold value RSH2 described above are set.

Specifically, even in a state where the motor generator MG2 performs the predetermined regeneration operation to generate electricity, a total loss of a rotating electrical machine loss which occurs due to the rotation of the motor generator MG2 and a frequency conversion loss which occurs due to frequency conversion in the frequency conversion portion 5 is consumed as the loss, and regenerative electric power is substantially not charged in the smoothing capacitor 4f. Thus, the rotational speed lower limit threshold value RSL1 and the rotational speed upper limit threshold value RSH2 can be set so that the motor generator MG2 performs the regeneration to generate electric power corresponding to the total loss of the rotating electrical machine loss which occurs due to the rotation of the motor generator MG2 and the frequency conversion loss which occurs due to the frequency conversion in the frequency conversion portion 5.

In FIG. 7B, a region where the torque limitation is applied is shown as a region AL and a region where the torque limitation is not applied is shown as a region AF. The same applies for FIG. 10 described later.

For example, when the total loss is approximately 1 kW and a creep torque necessary for starting the vehicle is 60 N·m, the rotational speed lower limit threshold value RSL1 can be −150 rpm and the rotational speed upper limit threshold value RSH2 can be +150 rpm.

In the control unit 10, in the state where the abnormality detection portion 15 detects the abnormality and the voltage conversion portion 4 is substantially stopped as described above, the torque limitation portion 16 limits the MG2 torque command value of the MG2 operation point determined by the MG2 operation point determination portion 13. Thus, since the regeneration is substantially accepted and the predetermined positive torque can be generated even if the vehicle rolls away (moves backward) at a forward start on an uphill, the vehicle can be started well. In a similar manner, a reverse start on a downhill can also be performed well.

1-5. Method of Controlling Hybrid Drive Device

Figure 8:
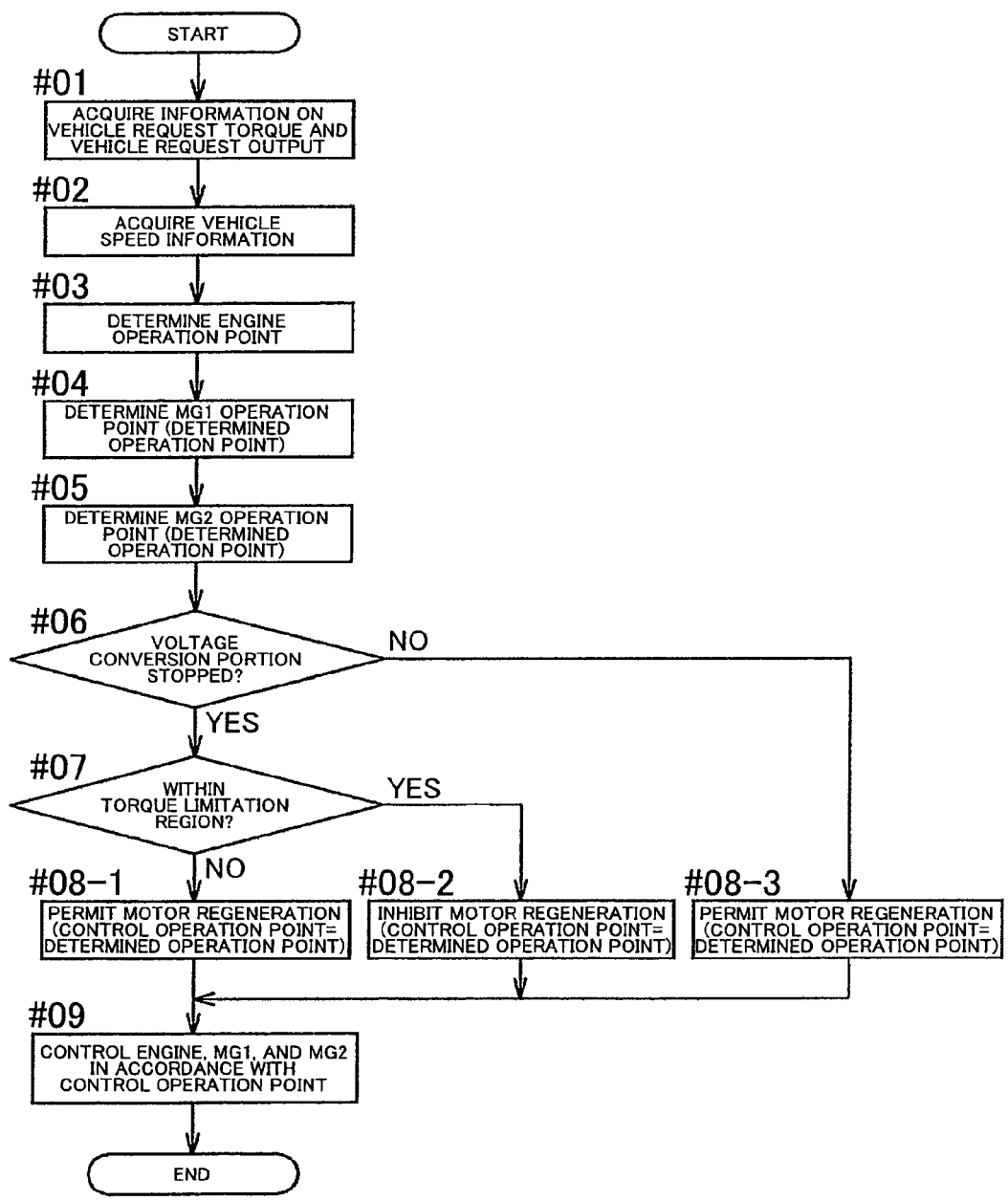
FIG. 8 is a flowchart of a method of controlling the hybrid drive device.

Hereinafter, a method of controlling the hybrid drive device H according to this embodiment will be described based on the flowchart of FIG. 8.

A process of controlling the hybrid drive device H is executed by one or both of the hardware and the software (program) constituting the respective function portions 11 to 16 of the control unit 10. In the case where each of the function portions is structured by a program, the arithmetic processing device of the control unit 10 operates as a computer which executes the program constituting each of the function portions.

The control unit 10 first acquires information of the vehicle request torque TC and the vehicle request output PC input from the vehicle side (step #01). The control unit 10 acquires the vehicle speed information detected by the vehicle speed sensor Se4 (step #02). Then, the control unit 10 determines the engine operation point using the engine operation point determination portion 11 (step #03).

The control unit 10 determines the MG1 operation point using the MG1 operation point determination portion 12 (step #04), and determines the MG2 operation point using the MG2 operation point determination portion 13 (step #05). In the case of starting the vehicle in the EV mode described above, the MG2 operation point takes a significant value.

Next, a detection state of the abnormality detection portion 15 is checked (step #06). In a normal state where an abnormality is not detected in the abnormality detection portion 15 (step #06: No), the determined operation point which is the operation point determined in advance directly becomes the control operation point (step #8-3). That is, all operation points accepted in the normal state with respect to the motor generator MG2 are accepted, and the regeneration is obviously also accepted.

On the other hand, in a state where an abnormality is detected in the abnormality detection portion 15 (step #06: Yes), whether the determined operation point is an operation point within the torque limitation region AL in the rotating electrical machine control map is judged (step #07). In the case where the determined operation point is within the torque limitation region AL (step #07: Yes), a limited operation point in which the torque limitation is applied (the torque is brought to zero) with respect to the determined operation point becomes the control operation point (step #8-2). As a result, the regeneration of the motor generator MG2 operating as the motor is inhibited.

In the case where the determined operation point is not within the torque limitation region AL (step #07: No), the determined operation point determined in advance directly becomes the control operation point (step #8-1). As a result, the regeneration of the motor generator MG2 operating as the motor is accepted.

After the processes have been finished, the control unit 10 executes the control at the obtained control operation points with respect to the engine and the motor generators MG1 and MG2.

In this manner, in the state where an abnormality has occurred in a part relating to the voltage conversion portion 4 and the voltage conversion portion 4 is substantially stopped, a hill start can be performed well by accepting the regeneration of the second motor generator MG2 only in a region where the rotational speed is considerably low.

2. Second Embodiment

Figure 9:
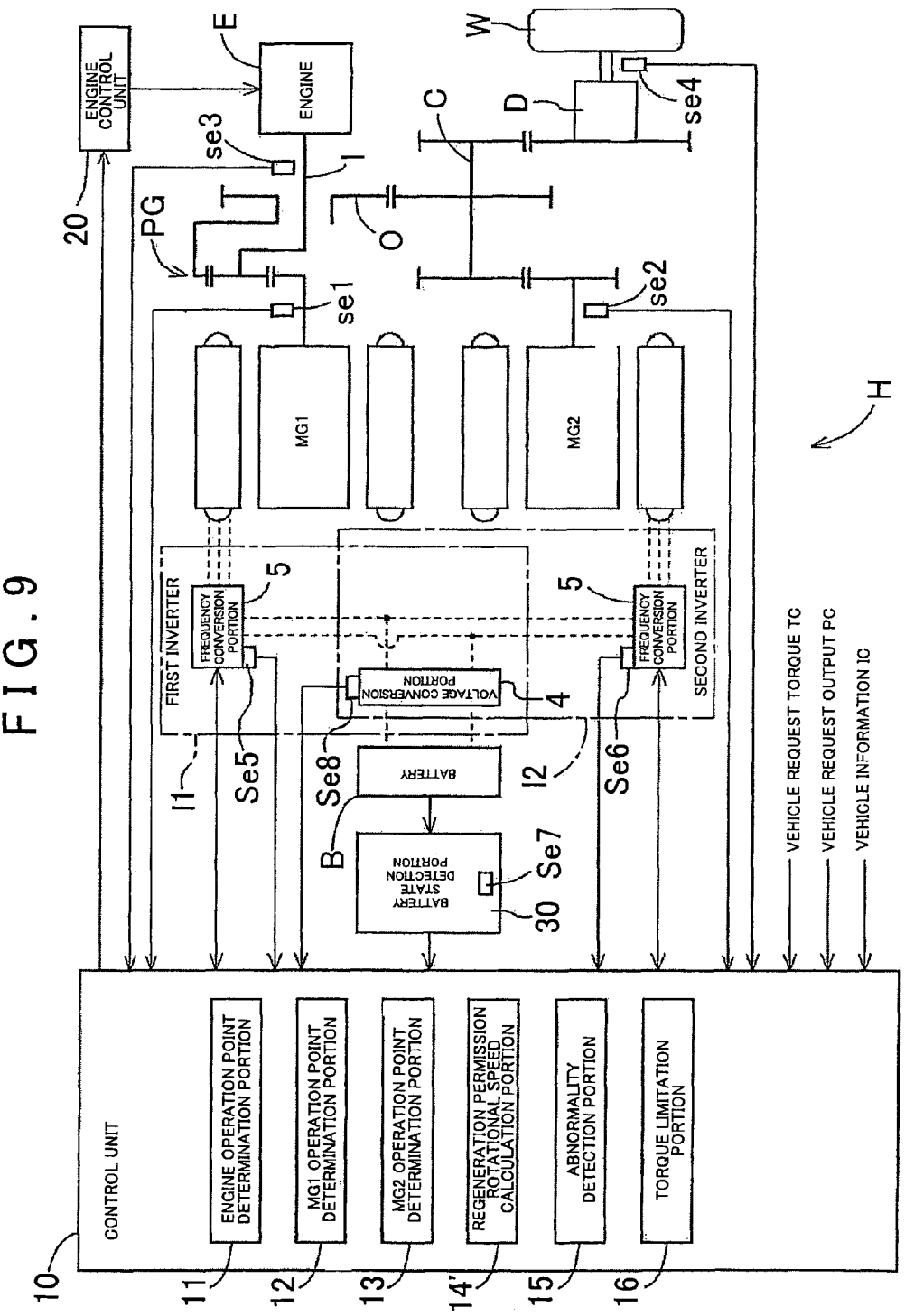
FIG. 9 is a block diagram showing a system configuration of a hybrid drive device according to a second embodiment.
Figure 10:
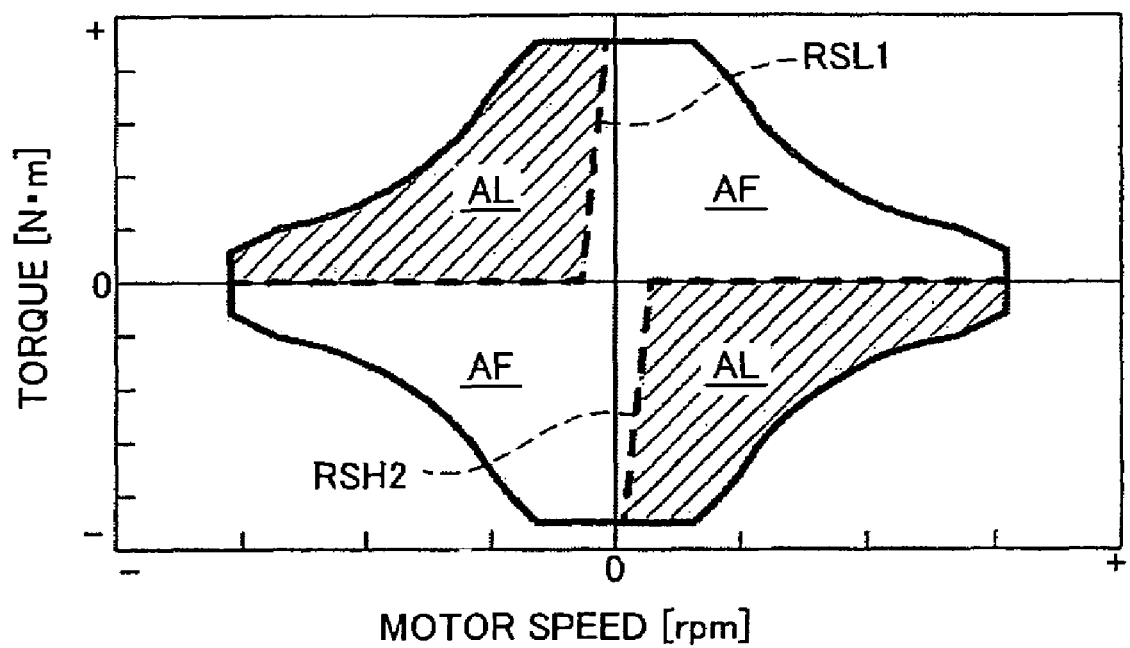
FIG. 10 is a map showing a correlation between a rotational speed and a torque of a rotating electrical machine of the second embodiment.
Figure 11:
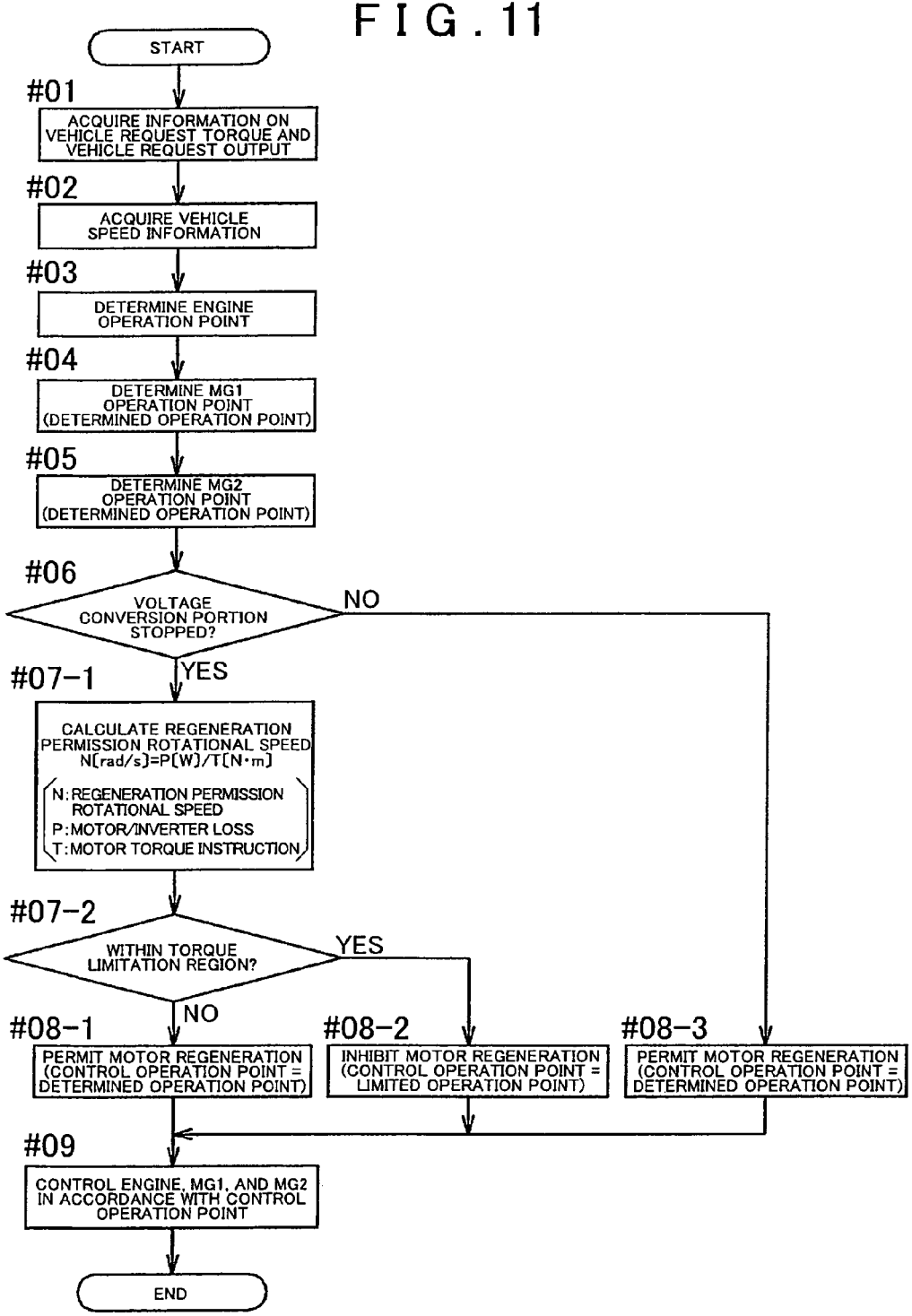
FIG. 11 is a flowchart of a method of controlling the hybrid drive device.

Next, a second embodiment of the present invention will be described. Also in the hybrid drive device H according to this embodiment, the regeneration operation of the motor generator MG2 is accepted under a certain condition. FIG. 9 shows a system configuration of the hybrid drive device H of the second embodiment. Further, FIG. 10 shows a map showing the correlation between the rotational speed and the torque of the motor generator of the second embodiment, and FIG. 11 shows a flowchart of a method of controlling the hybrid drive device H. The drawings respectively correspond to FIGS. 2, 7B, and 8 of the first embodiment.

The differences from the first embodiment will mainly be described below.

In the first embodiment, as described above based on FIG. 7B and the like, the rotational speed lower limit threshold value RSL1 and the rotational speed upper limit threshold value RSH2 have both been fixed values. That is, regardless of the torque requested for the motor generator MG2, the region in which the positive torque can be generated and the region in which the negative torque is generated have been determined by the predetermined rotational speed threshold values.

However, in an embodiment of the present invention, the smoothing capacitor 4*f* can be protected in order to prevent the voltage applied to the smoothing capacitor 4*f* from exceeding the withstand voltage, as long as an electricity generation amount generated by the motor generator performing the regeneration operation corresponds to the total loss of the rotating electrical machine loss which occurs due to the rotation of the motor generator MG2 and the frequency conversion loss which occurs due to the frequency conversion in the frequency conversion portion 5, as described above. Regarding the regeneration side, a product of the rotational speed and the torque becomes an electric power amount for the motor generator MG2. Thus, a regeneration permission rotational speed N acceptable in a specific operation state can be obtained as $N=P/T$, where T shows the requested torque at the point and P shows the total loss. In this case, the regeneration permission rotational speed decreases as the requested torque increases. The requested torque obviously differs depending on the stepped amount of the accelerator, the stepped amount for a brake, or the like.

Thus, in the second embodiment, the regeneration permission rotational speed is obtained from the total loss and the requested torque which are made apparent in advance.

As shown in FIG. 9, the hybrid drive device H according to this embodiment includes a regeneration permission rotational speed calculation portion 14' instead of the storage portion 14 of the first embodiment in the control unit 10. The regeneration permission rotational speed calculation portion 14' obtains the regeneration permission rotational speed N based on the total loss P of the rotating electrical machine loss which occurs due to the rotation of the motor generator MG2 and the frequency conversion loss which occurs due to the frequency conversion in the frequency conversion portion 5 and the requested torque T. The total loss P is a value obtained in advance. Further, the regeneration permission rotational speed N can be obtained using, as the requested torque T, an command value obtained as the control operation point with respect to the motor generator MG2.

The other function portions 11, 12, 13, 15, and 16 provided in the control unit 10 are similar to those described above.

A map of case where the regeneration permission rotational speed N obtained as described above is employed as the rotational speed lower limit threshold value RSL1 and the rotational speed upper limit threshold value RSH2 is shown schematically in a similar manner in FIG. 10 by dotted lines. As a result, the rotational speed lower limit threshold value RSL1 and the rotational speed upper limit threshold value RSH2 approximate zero as the absolute value of the torque increases.

FIG. 11 shows a flowchart of a case of employing this configuration. In this flowchart, steps #7-1 and #7-2 differ from the flowchart illustrated in FIG. 8. In step #7-1, the regeneration permission rotational speed calculation portion 14' obtains the regeneration permission rotational speed N using the requested torque T and the total loss P. In the example shown in FIG. 11, the requested torque T is shown as a "motor torque instruction," and the total loss is shown as a "motor/inverter loss." With respect to the regeneration permission rotational speed N obtained in this manner, a region on the low rotational speed side (in the case where the requested torque is positive) or a region on the high rotational speed side (in the case where the requested torque is negative) corresponding to the requested torque is determined as the torque limitation region.

Thus, a judgment on whether the operation point is within the torque limitation region is performed in step #7-2 to achieve a good driving state.

3. Other Embodiments (1) In the first embodiment and the second embodiment described above, an example has been shown in which the rotating electrical machine control system according to an embodiment of the present invention is applied to the hybrid drive device including the rotating electrical machine and another driving source (for example, engine).

However, the structure according to an embodiment of the present invention may be applied to a device including a DC power supply, a rotating electrical machine for driving a vehicle, a frequency conversion portion provided between the DC power supply and the rotating electrical machine to convert an output of the DC power supply to alternating current when the rotating electrical machine performs power running and convert an output from the rotating electrical machine to direct current when the rotating electrical machine performs regeneration, and a voltage conversion portion provided between the DC power supply and the frequency conversion portion to increase a voltage of the output of the DC power supply based on a boost command value set in accordance with a requested torque requested for the rotating electrical machine. An electric automobile can be given as a representative example. An embodiment of the present invention may also be employed for a one-motor parallel or series hybrid vehicle.

(2) In the embodiments described above, a case has been shown where the abnormality detection portion detects an abnormality requiring the voltage conversion portion to be stopped when the boost voltage obtained by increasing the voltage of the DC power supply based on the boost instruction is not a desired voltage. However, the stoppage of the voltage conversion portion may be executed upon a failure of the frequency conversion portion, a failure in a processing portion in the control unit for boost control, an abnormality in a circuit including the voltage sensor Se8 which detects the voltage after the voltage increase, overheating of the reactor, an abnormality in temperature of an arm in the boost circuit, or the like.

(3) In the embodiments described above, the region in which the regeneration is permitted or the region in which the torque is limited has been judged according to the map held in advance. However, since the rotational speed upper limit threshold value and the rotational speed lower limit threshold value take values in accordance with the state of the vehicle, a configuration may be employed in which a value obtained in advance or a calculated value is obtained to serve for the acceptance of the regeneration and the limitation of the torque. Although the rotational speed upper limit threshold value and the rotational speed lower limit threshold value have been values of the same absolute values, the two threshold values may be set by different setting methods since a fixed value and a value set variably in accordance with the requested torque are possible as described above.

(4) In the embodiments described above, a case where the differential gear device is the single-pinion type planetary gear mechanism including the three rotational components of the sun gear s, the carrier ca, and the ring gear r has been described as an example. However, the differential gear device according to an embodiment of the present invention is not limited thereto. Thus, for example, a differential gear device which is structured to include another differential gear mechanism such as in a double-pinion type planetary gear mechanism or a differential gear mechanism using a plurality of bevel gears meshing with each other is also suitable. The differential gear device is not limited to that including three rotational components, and a differential gear device which is structured to include four or more rotational components is also suitable. In this case as well, three rotational components selected from the four or more rotational components are the first rotational component, the second rotational component, and the third rotational component in order of rotational speed, the first rotational component being connected with the first rotating electrical machine, the second rotational component being connected with an input member, and the third rotational component being connected with the output member and the second rotating electrical machine. Note that, as the differential gear device including four or more rotational components, a configuration in which rotational components of a part of two or more sets of planetary gear mechanisms are connected to each other may be used, for example.

(5) In the embodiments described above, as shown in FIG. 1, an example has been described of the hybrid drive device H having a configuration in which the counter drive gear O as the output member which rotates integrally with the third rotational component (the ring gear r of the planetary gear device PG) of the differential gear device is connected to the wheel W via the counter gear mechanism C and the differential device D and the second motor generator MG2 is connected to the counter drive gear O and the differential device D via the counter gear mechanism C. The hybrid drive device H having such configuration can be made short in a direction of the input shaft I connected to the engine E, and therefore is suitably used in an FF vehicle, an MR vehicle, an RR vehicle, and the like. However, the mechanical configuration of the hybrid drive device H according to the embodiment described above is merely an example, and an embodiment of the present invention may obviously be applied to the hybrid drive device H having other mechanical configurations. Thus, for example, an embodiment of the present invention may be applied to a hybrid drive device having an arrangement/configuration used suitably for an FR vehicle in which the input shaft I connected to the engine E, the first motor generator MG1, the planetary gear device PG as the differential gear device, and the second motor generator MG2 are arranged coaxially.

Some aspects of the present invention can be used suitably in a drive device for both an electric automobile and a hybrid vehicle including an engine and a rotating electrical machine as drive power sources.

According to an exemplary aspect of the invention, the region in which the positive torque can be generated by the rotating electrical machine without the torque limitation being applied is the region of the rotational speed lower limit threshold value, which is less than zero, or greater, and the region in which the negative torque can be generated is the region of the rotational speed upper limit threshold value, which is greater than zero, or less. Thus, the generation of the positive torque is accepted in the region of the rotational speed lower limit threshold value or greater even in a driving state where the rotational speed is negative, and the generation of the negative torque is accepted in the rotational speed upper limit threshold value or less even in a driving state where the rotational speed is positive. That is, the regeneration of the rotating electrical machine is accepted in a certain region including the region where the rotational speed is zero. As a result, the rotating electrical machine control system can be obtained which enables a required torque to be generated even in the case where, for example, a failure of the voltage conversion portion is detected, and which does not require a smoothing capacitor of a special specification to be employed while providing a solution to the problem in the hill start.

According to an exemplary aspect of the invention, even if the rotating electrical machine performs regeneration and all of the generated electric power is charged in the smoothing capacitor, the capacitor can be protected well since the voltage of the smoothing capacitor is the withstand voltage or less.

According to an exemplary aspect of the invention, the capacitor can be protected well since all of the electric power generated by the regeneration of the rotating electrical machine is consumed as the loss and is not charged in the capacitor.

According to an exemplary aspect of the invention, with the threshold values being fixed values and the threshold values being obtained in advance, a determination can easily be executed between a region in which the torque limitation is performed and a non-limitation region in which the rotating electrical machine is operated directly at the operation point of the rotating electrical machine determined based on the request from the vehicle side.

According to an exemplary aspect of the invention, a problem does not occur in a regional range in which the regeneration is accepted according to the present invention as long as all of the electric power generated by the regeneration is consumed as the loss. The requested torque requested for the rotating electrical machine changes depending on an inclination degree of a hill, a depression amount of an accelerator, or the like. Thus, by variably setting the threshold values to depend on the value of the requested torque, an appropriate torque can be generated while protecting the smoothing capacitor.

According to an exemplary aspect of the invention, in the region in which the torque limitation is not applied, the driving state in which the voltage conversion portion is not stopped can be achieved directly.

According to an exemplary aspect of the invention, by employing the rotating electrical machine control system of the present invention for a hybrid vehicle having a so-called split form, a hill start or the like can be performed well with the hybrid vehicle.

According to an exemplary aspect of the invention, a hybrid vehicle can be achieved using a most simple differential gear device.

According to an exemplary aspect of the invention, the hybrid vehicle described above is started in an electric drive mode (EV mode). However, by employing a configuration in which the torque limitation by the torque limitation portion is executed along with the detection of abnormality by the abnormality detection portion in the EV mode of driving with only the output torque of the second rotating electrical machine, the vehicle can be started well while protecting the smoothing capacitor.

What is claimed is:

1. A rotating electrical machine control system comprising:
    a rotating electrical machine that drives a vehicle;
    a frequency conversion portion provided between a DC power supply and the rotating electrical machine, the frequency conversion portion converts an output of the DC power supply to alternating current when the rotating electrical machine performs power running and converts an output from the rotating electrical machine to direct current when the rotating electrical machine performs regeneration;
    a voltage conversion portion provided between the DC power supply and the frequency conversion portion, the voltage conversion portion increases a voltage of the output of the DC power supply based on a boost command value set in accordance with a requested torque requested for the rotating electrical machine;
    a torque limitation portion that limits a torque of the rotating electrical machine; and
    an abnormality detection portion that detects an abnormality requiring the voltage conversion portion to be stopped, wherein when the abnormality detection portion has detected the abnormality:
        the torque limitation portion limits generation of a positive torque in a region of less than a rotational speed lower limit threshold value where a rotational speed of the rotating electrical machine is less than zero, and sets a region in which the positive torque is generated to a region of the rotational speed lower limit threshold value or greater, and
        the torque limitation portion limits generation of a negative torque in a region of greater than a rotational speed upper limit threshold value where the rotational speed of the rotating electrical machine is greater than zero, and sets a region in which the negative torque is generated to a region of the rotational speed upper limit threshold value or less.

2. The rotating electrical machine control system according to claim 1, wherein, regarding a smoothing capacitor provided between the voltage conversion portion and the frequency conversion portion, the rotational speed lower limit threshold value and the rotational speed upper limit threshold value are set as threshold values by which a voltage of the smoothing capacitor is maintained to a withstand voltage or less when electric power to be returned from the rotating electrical machine to a DC power supply side is charged in the smoothing capacitor in a state where the voltage conversion portion is stopped.

3. The rotating electrical machine control system according to claim 2, wherein the rotational speed lower limit threshold value and the rotational speed upper limit threshold value are set so that the rotating electrical machine performs regeneration to generate electric power corresponding to a total loss of a rotating electrical machine loss that occurs due to rotation of the rotating electrical machine and a frequency conversion loss that occurs due to frequency conversion in the frequency conversion portion.

4. The rotating electrical machine control system according to claim 3, wherein the rotational speed lower limit threshold value and the rotational speed upper limit threshold value are fixed values.

5. The rotating electrical machine control system according to claim 1, wherein the rotational speed lower limit threshold value and the rotational speed upper limit threshold value are set variably based on a relationship between a total loss of a rotating electrical machine loss that occurs due to rotation of the rotating electrical machine and a frequency conversion loss that occurs due to frequency conversion in the frequency conversion portion and the requested torque.

6. The rotating electrical machine control system according to claim 1, wherein:
- the output from zero to a positive-side maximum torque is accepted for the rotating electrical machine in a state where the rotating electrical machine generates the positive torque and the rotational speed of the rotating electrical machine is the rotational speed lower limit threshold value or greater; and
- the output from zero to a negative-side maximum torque is accepted for the rotating electrical machine in a state where the rotating electrical machine generates the negative torque and the rotational speed of the rotating electrical machine is the rotational speed upper limit threshold value or less.

7. A vehicle drive system comprising:
- the rotating electrical machine control system according to claim 1;
- a first rotating electrical machine and a second rotating electrical machine as the rotating electrical machine; and
- a power distribution mechanism that distributes a driving force generated from a driving source other than the first rotating electrical machine and the second rotating electrical machine,
- wherein the driving force distributed by the power distribution mechanism is transmitted to a wheel on one side and to the first rotating electrical machine on another side, and a driving force generated by the second rotating electrical machine is transmitted to the wheel.

8. The vehicle drive system according to claim 7, wherein:
- the power distribution mechanism includes a differential gear device including a first rotational component, a second rotational component, and a third rotational component; and
- the first rotating electrical machine is connected to the first rotational component, a driving source other than the first rotating electrical machine and the second rotating electrical machine is connected to the second rotational component, and the second rotating electrical machine and the third rotational component are connected to the wheel.

9. The vehicle drive system according to claim 8, wherein, in an electric drive mode of driving only with an output torque of the second rotating electrical machine, torque limitation by the torque limitation portion is executed along with detection of abnormality by the abnormality detection portion.

\* \* \* \* \*